(12) United States Patent
Ishida et al.

(10) Patent No.: US 8,905,650 B2
(45) Date of Patent: Dec. 9, 2014

(54) FIBER-OPTIC CABLE WITH FITTING

(75) Inventors: Hidetoshi Ishida, Yokkaichi (JP); Hiroyoshi Maesoba, Yokkaichi (JP); Tetsuji Tanaka, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 113 days.

(21) Appl. No.: 13/704,161

(22) PCT Filed: Sep. 5, 2011

(86) PCT No.: PCT/JP2011/070179
§ 371 (c)(1),
(2), (4) Date: Dec. 13, 2012

(87) PCT Pub. No.: WO2012/033057
PCT Pub. Date: Mar. 15, 2012

(65) Prior Publication Data
US 2013/0094814 A1    Apr. 18, 2013

(30) Foreign Application Priority Data
Sep. 6, 2010  (JP) .................. 2010-198477

(51) Int. Cl.
G02B 6/36  (2006.01)
G02B 6/44  (2006.01)
G02B 6/38  (2006.01)

(52) U.S. Cl.
CPC .............. G02B 6/443 (2013.01); G02B 6/3889 (2013.01)
USPC .............................................. 385/77; 385/81

(58) Field of Classification Search
None
See application file for complete search history.

(56) References Cited

U.S. PATENT DOCUMENTS

| 4,914,261 A | * | 4/1990 | Tokumaru et al. | ............... 174/92 |
| 2002/0031311 A1 | | 3/2002 | Shiino et al. | |
| 2013/0094814 A1 | | 4/2013 | Ishida et al. | |

FOREIGN PATENT DOCUMENTS

| JP | A-4-97108 | 3/1992 | |
| JP | A-2002-90582 | 3/2002 | |
| JP | 2008-193768 | * 8/2008 | ............... G02B 6/44 |

(Continued)

OTHER PUBLICATIONS

International Search Report issued in International Patent Application No. PCT/JP2011/070179 dated Oct. 4, 2011.

(Continued)

*Primary Examiner* — Uyen Chau N Le
*Assistant Examiner* — Chad Smith
(74) *Attorney, Agent, or Firm* — Oliff PLC

(57) ABSTRACT

A fiber-optic cable with a fitting capable of increasing connection strength between a fiber-optic cable and an optical connector, which includes a fiber-optic cable including a sheath and a tensile member, an inner ring mounted on a circumference of the sheath from a position where the tensile member is drawn out of the sheath through a slit to a front end of the sheath, and a fitting mounted on the circumference and including a first portion mounted from the position where the tensile member is drawn out of the sheath to a position of the sheath on a side opposite to the ring side, and a second portion mounted while covering a circumference of the ring, wherein the first portion connects with the sheath, and the end portion of the tensile member is sandwiched by the ring and the second portion.

14 Claims, 11 Drawing Sheets

(56) References Cited

FOREIGN PATENT DOCUMENTS

| | | |
|---|---|---|
| JP | A-2008-191410 | 8/2008 |
| JP | A-2008-193768 | 8/2008 |
| JP | B2-5254499 | 8/2013 |
| WO | WO 2012/033057 A1 | 3/2012 |

OTHER PUBLICATIONS

Office Action issued in Japanese Patent Application No. 2013-086675 mailed Jan. 28, 2014 (with translation).

* cited by examiner

FIBER-OPTIC CABLE WITH FITTING

TECHNICAL FIELD

The present invention relates to a fiber-optic cable with a fitting, and more specifically relates to a fiber-optic cable with a fitting, which includes a fitting that is arranged to connect the fiber-optic cable and an optical connector by being fitted to the optical connector.

BACKGROUND ART

In automobiles, the volumes of in-car communication traffic have increased with an increase in in-car electrical components. Thus, in order to cope with the increased volumes of in-car communication traffic, measures to shift in-car communication media of electric wires to fiber-optic cables that include optical fibers and are capable of transmitting larger volumes of data at higher speed than the electric wires have been taken.

Optical connectors are used for connecting the fiber-optic cables, or connecting the fiber-optic cable and an optical transmitter and receiver module mounted on a circuit board. In carrying out wiring of the fiber-optic cables in an automobile, the fiber-optic cables could be pulled to apply tension between the fiber-optic cables and the optical connectors. Thus, the optical connectors, in particular, optical connectors for automobile use, are required to be tightly connected to the fiber-optic cables. In addition, relatively short fiber-optic cables for automobile or interior use usually have a configuration such that tensile members such as optical fibers and aramid fibers are laid in the center and covered with a sheath for protection. While the tensile members bear the tensile strength of the whole fiber-optic cables, what is directly pulled by a worker in actual wiring is the sheath when the worker pulls the fiber-optic cables. In this case, because the tensile members and the sheath are not of a monolithic construction, only the sheath could falloff the optical connector even if the tensile members are fixed to the optical connector with sufficient strength. In order to solve this problem, both the tensile members and the sheath need to be fixed to the optical connector.

The configuration disclosed in PTL 1 is proposed as a connecting structure between a fiber-optic cable and an optical connector, and is in widespread practical use. PTL 1 discloses an optical connector, in which a tensile member of a fiber-optic cable is sandwiched by a rear portion of a stopper for holding a ferrule, and a large diameter portion of a crimp ring while an end portion of a sheath of the fiber-optic cable is sandwiched by a small diameter portion of the crimp ring and a ring. This configuration prevents the optical connector from falling off the fiber-optic cable.

However, because the optical cable connector of PTL 1 has the configuration that the tensile member and the sheath are sandwiched by the different members, there arises a problem that the numbers of components and processes increase. In order to solve this problem, the configuration disclosed in PTL 2 is proposed, for example. PTL 2 discloses an optical connector that includes a thick cord cover (sheath), so that the cord cover itself functions as a crimping base (corresponding to the small diameter portion of the crimp ring of PTL 1). Thus, the numbers of components and processes are reduced. The configuration of PTL 2 is advantageous when a connected portion between a fiber-optic cable and the optical connector is desired to be short. In addition, because the prerequisite thick sheath can strengthen the fiber-optic cable, the configuration of PTL 2 is favorable for the fiber-optic cable used in automobiles where the fiber-optic cable is laid together with other wiring harnesses densely in a narrow space. However, because a crimping base is not used, the configuration could not obtain sufficient fixing strength of the sheath.

CITATION LIST

Patent Literature

PTL 1: JP H04-97108 A
PTL 2: JP 2008-191410 A

SUMMARY OF INVENTION

Technical Problem

The present invention has been made in view of the above circumstances and has an object to overcome the above problems, and to provide a fiber-optic cable with a fitting that can increase connection strength between a fiber-optic cable and an optical connector, especially can increase fixing strength of a sheath, while the numbers of components and processes of the cable are reduced. Another object is to provide a fiber-optic cable with a fitting, which includes a fitting arranged to be fitted to an optical connector, and can increase connection strength between the fitting and the fiber-optic cable.

Solution to Problem

To achieve the objects and in accordance with the purpose of the present invention, a fiber-optic cable with a fitting of the present invention includes a fiber-optic cable that includes a sheath including a slit on its end face in a longitudinal direction and a tensile member laid inside the sheath, an end portion of the tensile member being drawn out of the sheath through the slit, an inner ring mounted on a circumference of the sheath from a position of the sheath where the tensile member is drawn out of the sheath through the slit to a side of the end face of the sheath, and a fitting mounted on the circumference of the sheath, the fitting including a first portion that is mounted on the circumference of the sheath from the position of the sheath where the tensile member is drawn out of the sheath through the slit to a position of the sheath that is on a side opposite to the side where the inner ring is mounted, and a second portion that is mounted on the circumference of the sheath while covering a circumference of the inner ring, wherein the first portion of the fitting engages in the circumference of the sheath to connect with the sheath, and wherein the end portion of the tensile member is sandwiched by the inner ring and the second portion of the fitting.

It is also preferable that the sheath includes two opposed slits. It is also preferable that the sheath includes one slit. It is also preferable that the sheath includes three or more slits It is preferable that the tensile member is drawn out of the sheath through one or some of the slits.

Advantageous Effects of Invention

The fiber-optic cable with the fitting of the present invention can increase connection strength between the fitting and the fiber-optic cable, especially can increase fixing strength of the sheath.

In a conventional configuration shown in FIG. 11A such that a fitting 82 is mounted on a sheath 811 of a fiber-optic cable 81 at a position very close to an end face of the sheath 811, the sheath 811 does not have a portion that is not compressed or deformed on a front-end side more front than a first portion 821 of the fitting 82 (alternatively, the sheath 811 itself does not exist there). Thus, the fitting 82 and the sheath 811 are connected with each other only by the friction between the fitting 82 and the compressed circumference of the sheath 811. In this case, if a pull force larger than the friction is exerted between the sheath 811 and the fitting 82, the sheath 811 moves in an axial direction inside the fitting 82 to fall off the fitting 82 as shown in FIG. 11B because a tensile member 812 and the sheath 811 do not have a monolithic construction.

In contrast, in the fiber-optic cable with the fitting of the preferred embodiment of the present invention, the sheath has a portion that is not compressed or deformed on a front-end side more front than the first portion of the fitting. Thus, if a pull force larger than the friction is exerted between the sheath and the fitting, the portion that is not compressed or deformed is caught by the fitting to prevent the sheath from moving, or to minimize the movement. That is, in order to move the sheath in the axial direction, it is necessary to not only exert a force larger than the friction between the first portion of the fitting and the sheath, but also compress and deform the end portion of the sheath. For this reason, the connection strength between the fitting and the sheath increases compared with the configuration that the fitting and the sheath are connected with each other only by friction (in other words, the force necessary to move the sheath in the axial direction becomes larger).

In addition, the tensile member is drawn out of the sheath through the slit at a portion of the sheath on the front-end side more front than the first portion of the fitting. The tensile member is fitted (i.e., lies) in the slit at this portion of the sheath, so that the slit is pushed to stretch out in a circumferential direction to make this portion of the sheath larger in size in the circumferential direction than the other portion of the sheath. Thus, this portion of the sheath can prevent the sheath from falling off the fitting or minimize the fall more efficiently than the other portion of the sheath. In other words, though the fitting needs to pass through this portion of the sheath in order to move toward the end portion of the sheath, a force necessary to compress and deform this portion of the sheath is larger than a force necessary to compress and deform the other portion because this portion of the sheath is larger in external diameter than the other portion. For this reason, the connection strength between the fitting and the sheath increases.

Further, in the fiber-optic cable with the fitting of the present invention, the length in the axial direction of the first portion of the fitting can be made short, and the connection strength between the fitting and the fiber-optic cable can be increased at the same time. Alternatively, even if the length in the axial direction of the first portion of the fitting is made short, reduction in the connection strength between the fitting and the fiber-optic cable can be prevented or minimized. Thus, the fitting can be reduced in size. Then, the reduction in size of the fitting can reduce the size of an entire optical connector.

BRIEF DESCRIPTION OF DRAWINGS

FIG. 7A is a cross-sectional view of the fiber-optic cable with the fitting of the preferred embodiment of the present invention shown in FIG. 4D. Shown in FIG. 7B is a view showing the state where the fitting is pressed and deformed.

DESCRIPTION OF EMBODIMENTS

Detailed descriptions of preferred embodiments of the present invention will now be provided with reference to the accompanying drawings. It is to be noted that hereinafter "an axial direction" of each component of a fiber-optic cable with a fitting of the preferred embodiments of the present invention defines the longitudinal direction of a fiber-optic cable where the built-up fiber-optic cable with the fitting of the preferred embodiments of the present invention is used as a standard. Likewise, "a front-end side" defines the side closer to an end portion of the fiber-optic cable (i.e., the end portion where a fitting is mounted), and "a rear-end side" defines the side farther to the end portion of the fiber-optic cable.

Figure 1:
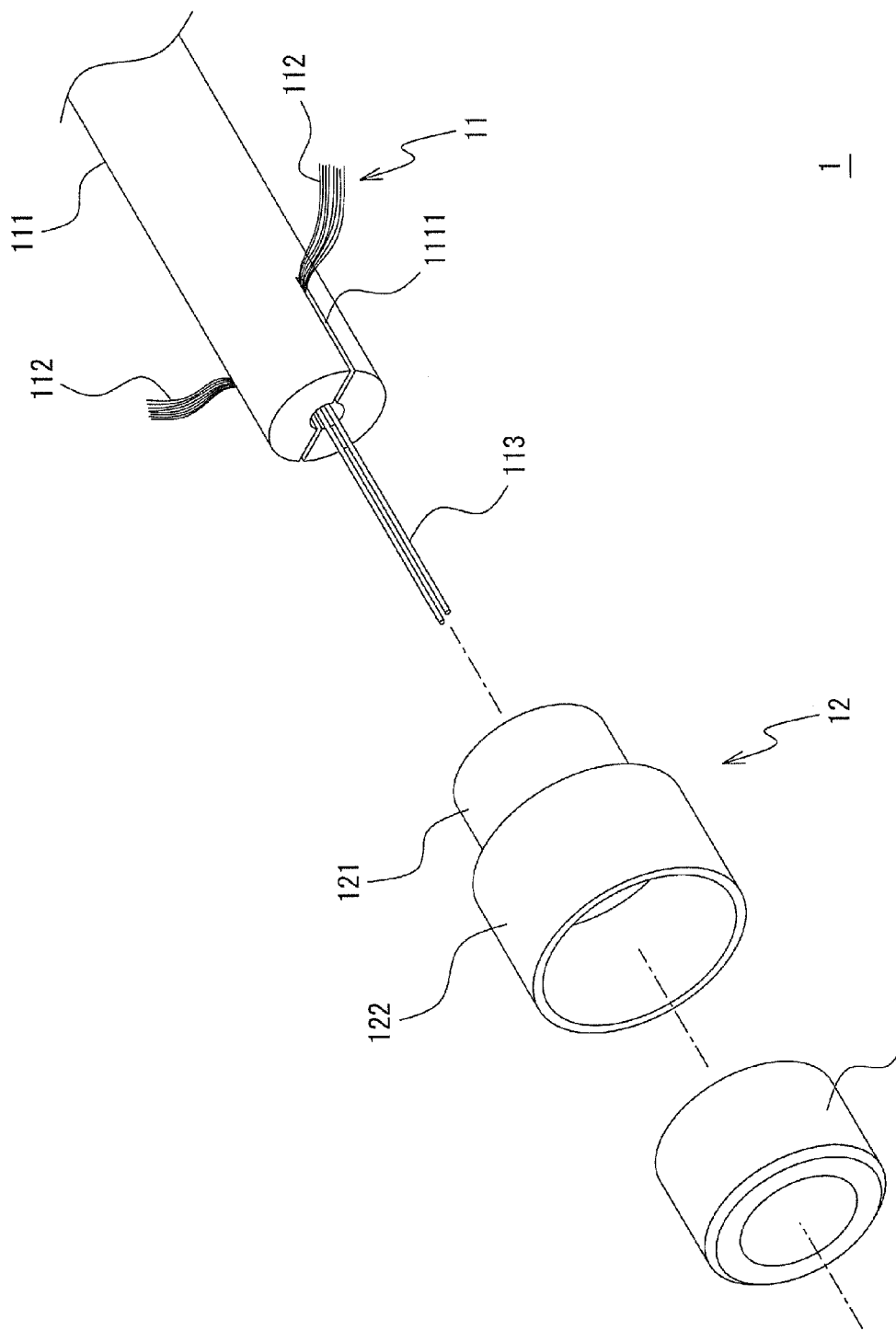
FIG. 1 is an exploded perspective view showing a configuration of a fiber-optic cable with a fitting of a preferred embodiment of the present invention.
Figure 2:
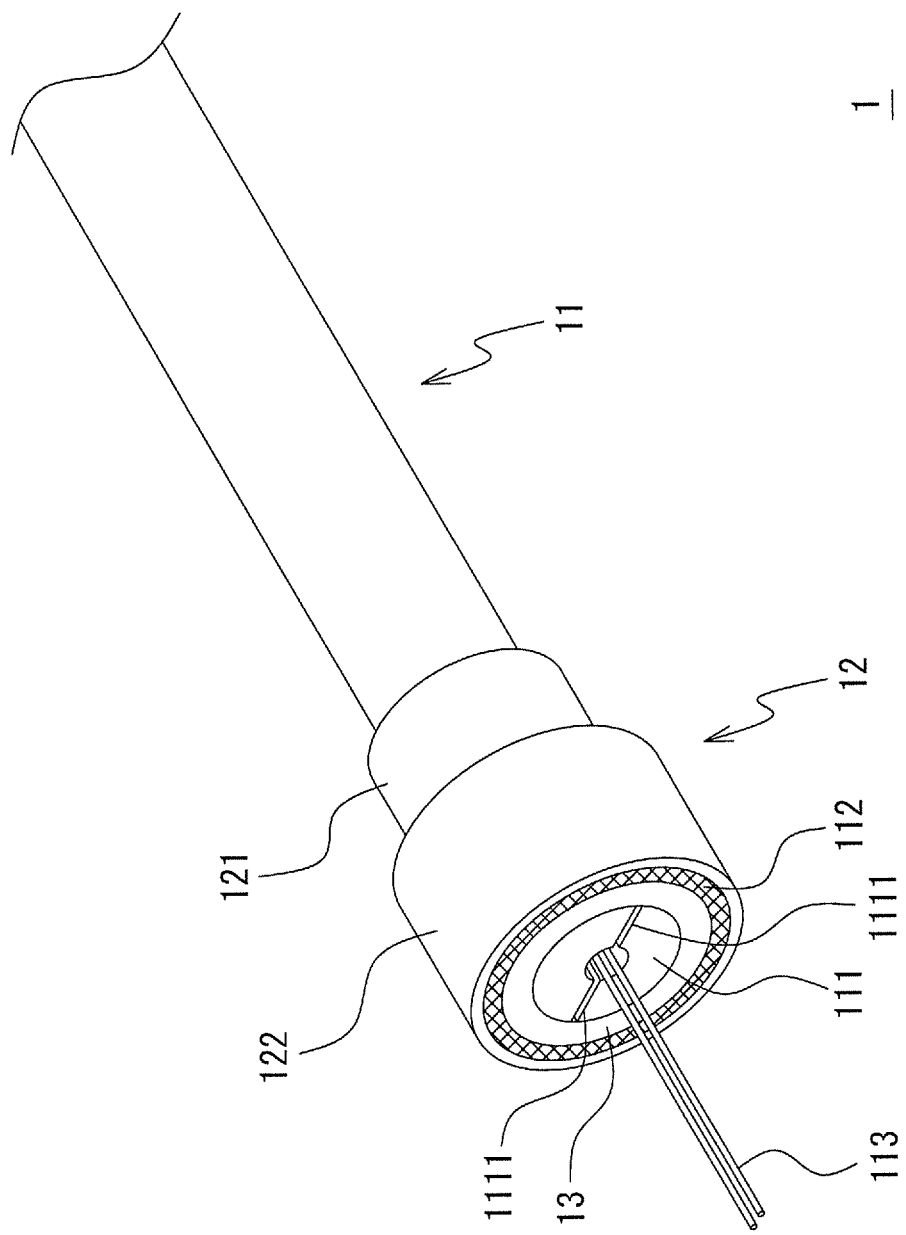
FIG. 2 is an external perspective view showing the configuration of the fiber-optic cable with the fitting of the preferred embodiment of the present invention.
Figure 3A:
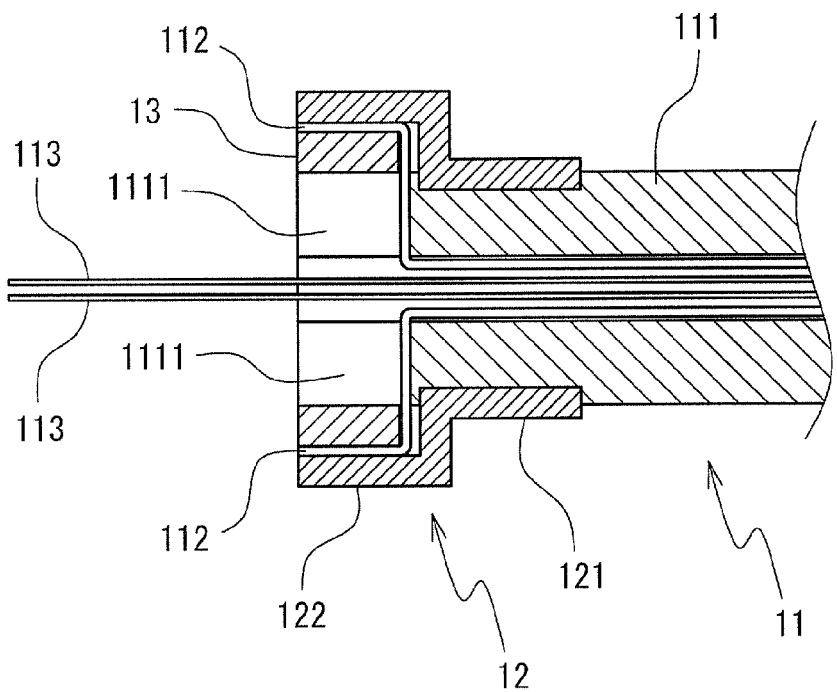
FIGS. 3A and 3B are cross-sectional views showing an inner structure of the fiber-optic cable with the fitting of the preferred embodiment of the present invention. Shown in FIG. 3A is the longitudinal cross-sectional view showing the profile, which includes slits, of the fiber-optic cable with the fitting. Shown in FIG. 3B is the longitudinal cross-sectional view showing the profile, which is perpendicular to the slits, of the fiber-optic cable with the fitting.
Figure 3B:
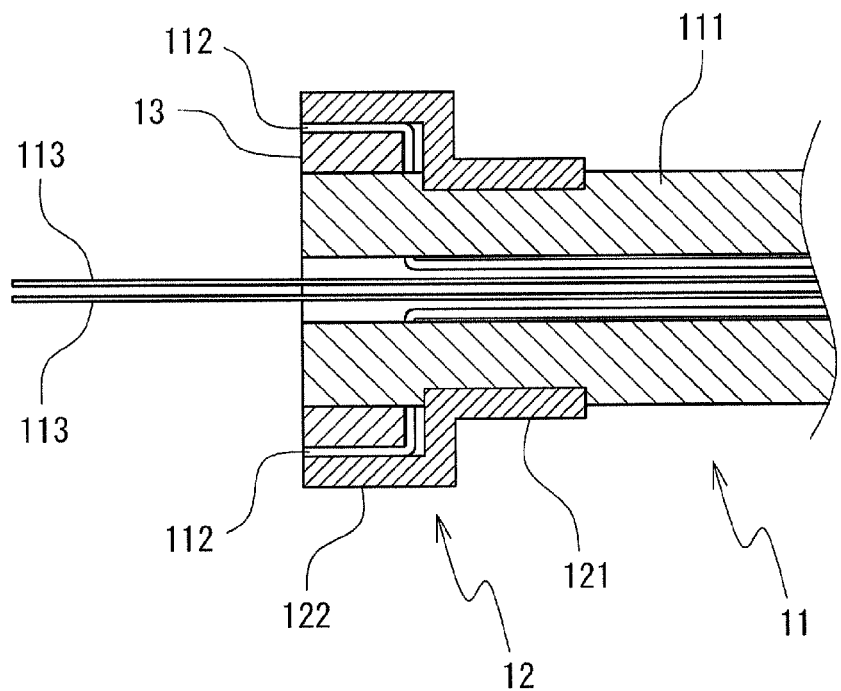
Figure 4A:
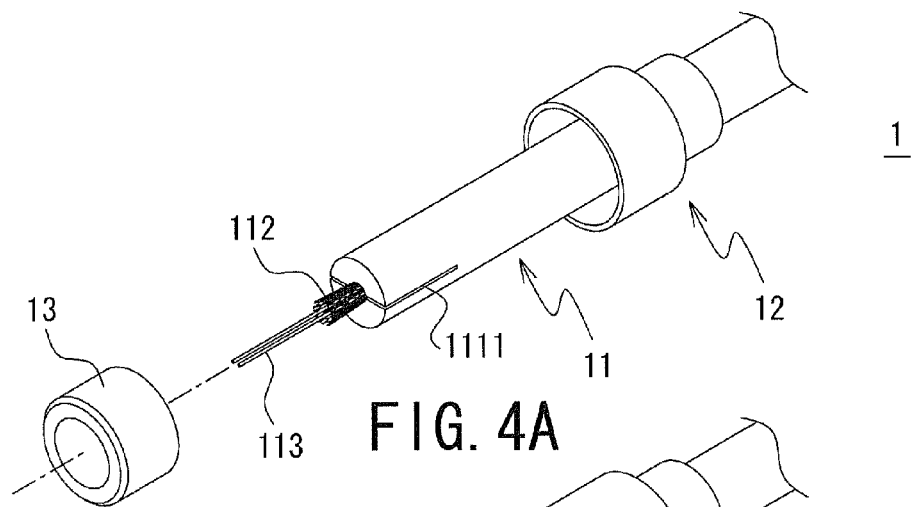
FIGS. 4A to 4D are perspective views schematically showing the state of a fiber-optic cable, an inner ring and fitting in building the fiber-optic cable with the fitting of the preferred embodiment of the present invention. Shown in FIG. 4A is the perspective view showing a sheath including two slits. Shown in FIG. 4B is the perspective view showing the sheath from which tensile members are drawn from the two slits. Shown in FIG. 4C is the perspective view showing the sheath on which the inner ring is mounted. Shown in FIG. 4D is the perspective view showing the state where a second portion of the fitting covers the circumference of the inner ring.
Figure 4B:
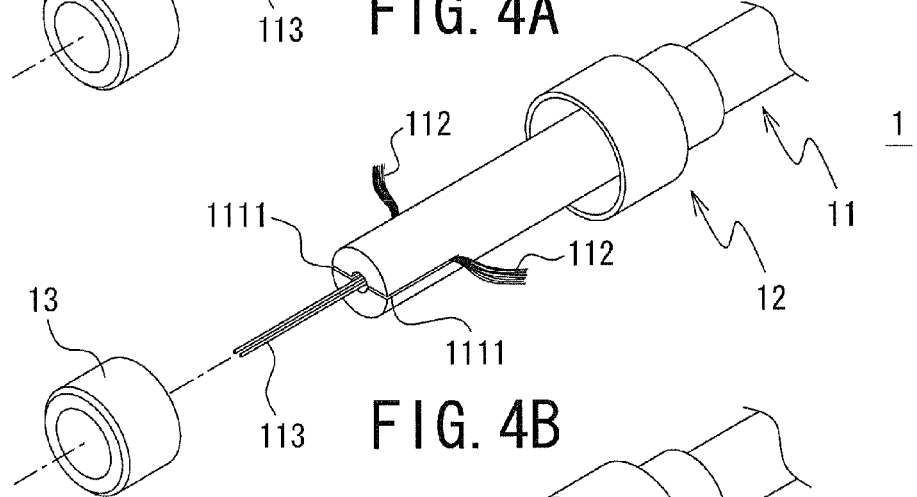
Figure 4C:
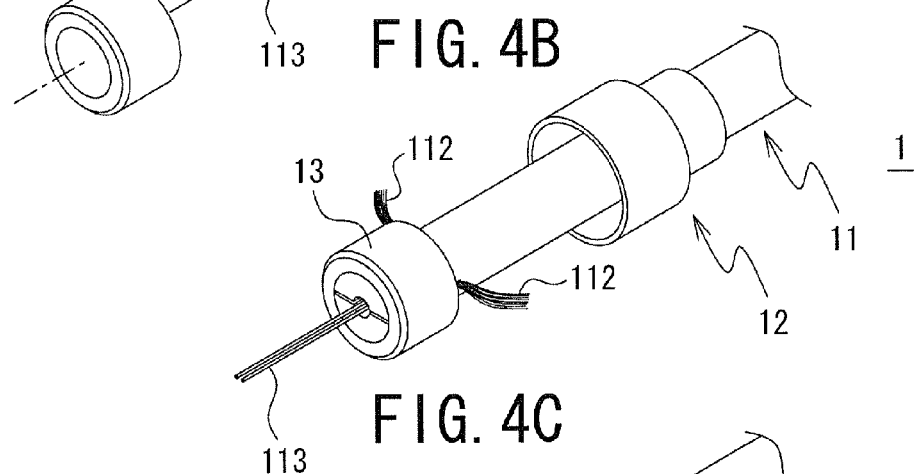
Figure 4D:
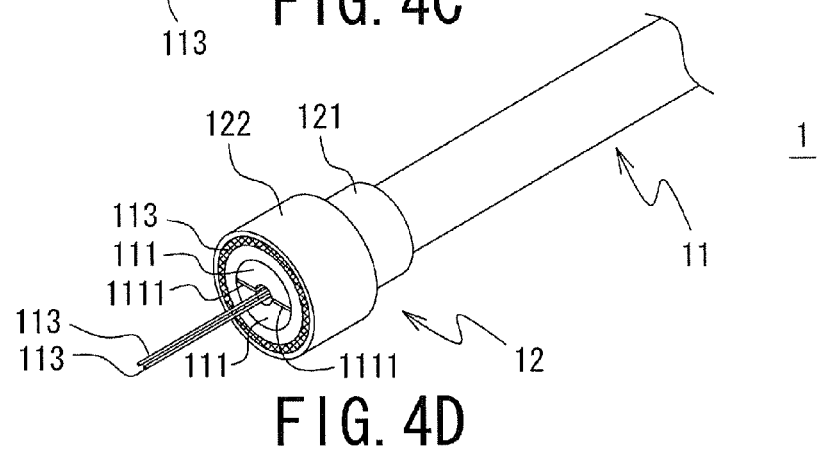
Figure 5A:
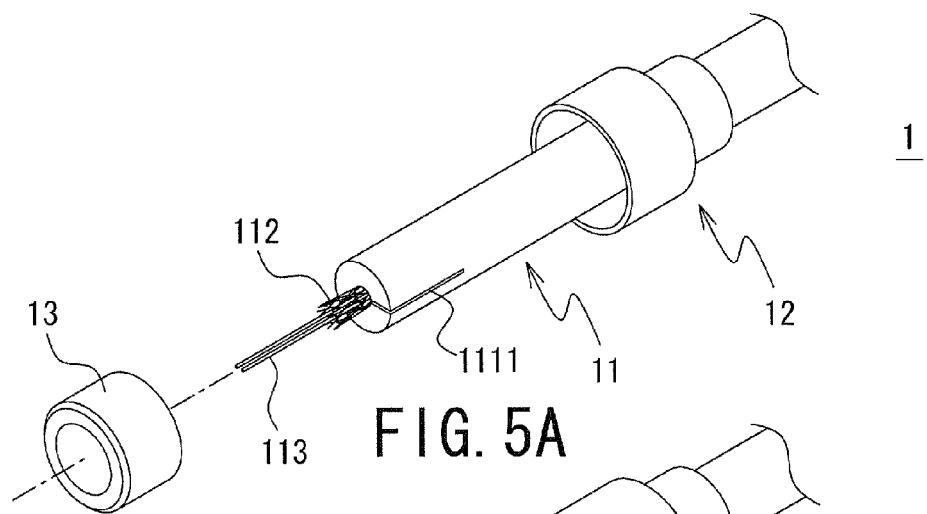
FIGS. 5A to 5D are perspective views schematically showing the state of the fiber-optic cable and the inner ring in building the fiber-optic cable with the fitting of the preferred embodiment of the present invention. Shown in FIG. 5A is the perspective view showing the sheath including one slit. Shown in FIG. 5B is the perspective view showing the sheath from which the tensile members are drawn from the one slit. Shown in FIG. 5C is the perspective view showing the sheath on which the inner ring is mounted. Shown in FIG. 5D is the perspective view showing the state where the second portion of the fitting covers the circumference of the inner ring.
Figure 5B:
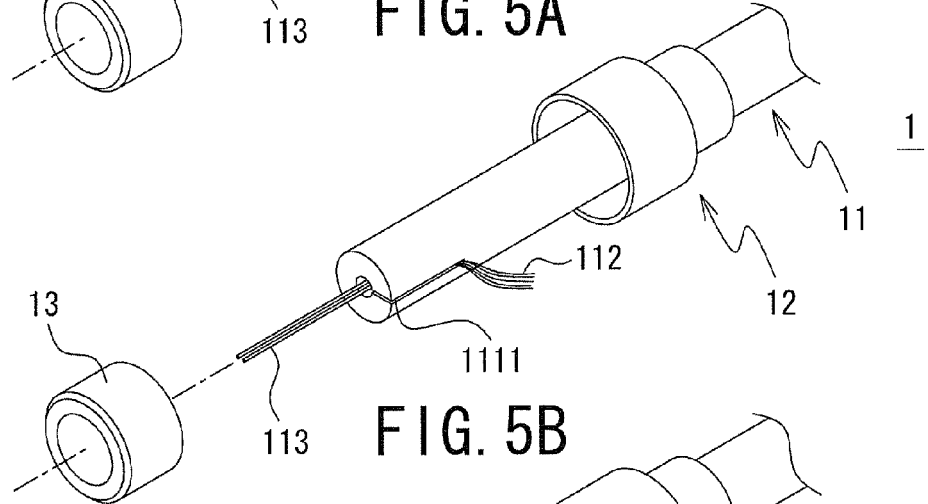
Figure 5C:
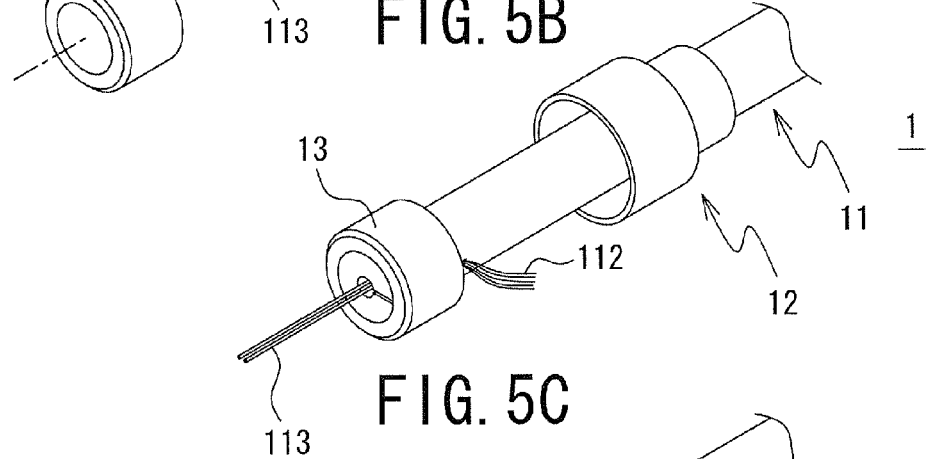
Figure 5D:
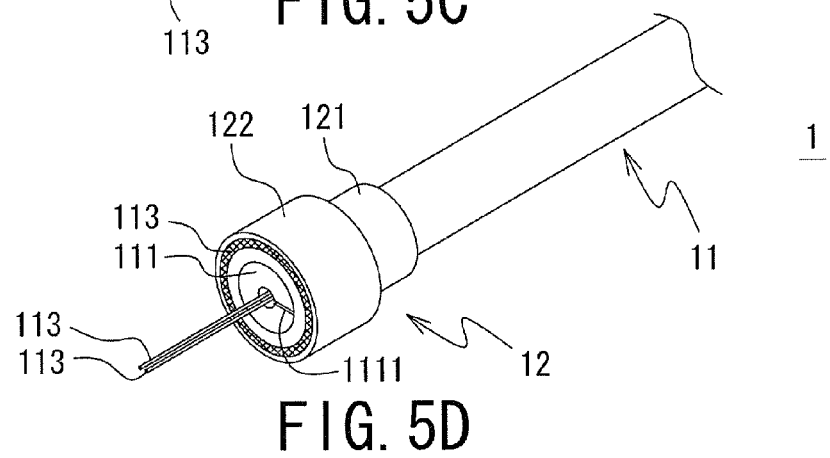
Figure 6A:
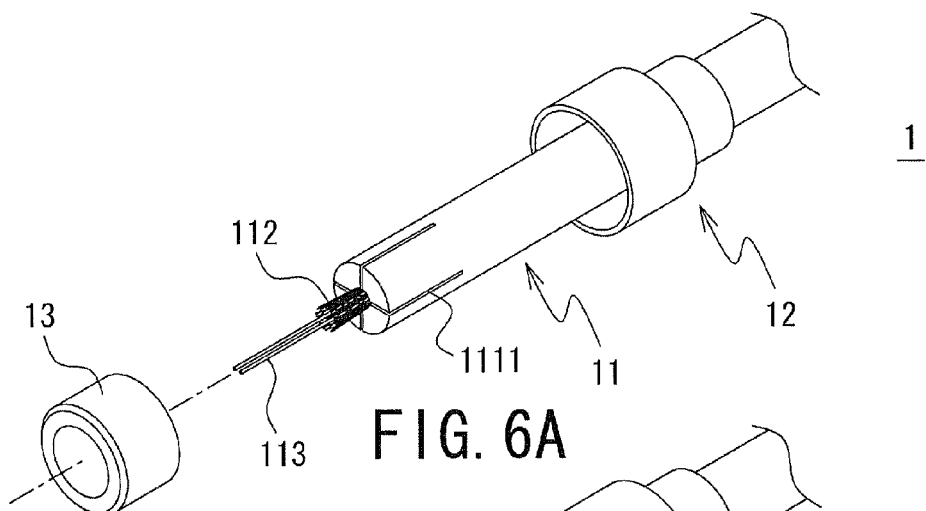
FIGS. 6A to 6D are perspective views schematically showing the state of the fiber-optic cable and the inner ring in building the fiber-optic cable with the fitting of the preferred embodiment of the present invention. Shown in FIG. 6A is the perspective view showing the sheath including four (more than three) slits. Shown in FIG. 6B is the perspective view showing the sheath from which the tensile members are drawn from the four slits. Shown in FIG. 6C is the perspective view showing the sheath on which the inner ring is mounted. Shown in FIG. 6D is the perspective view showing the state where the second portion of the fitting covers the circumference of the inner ring.
Figure 6B:
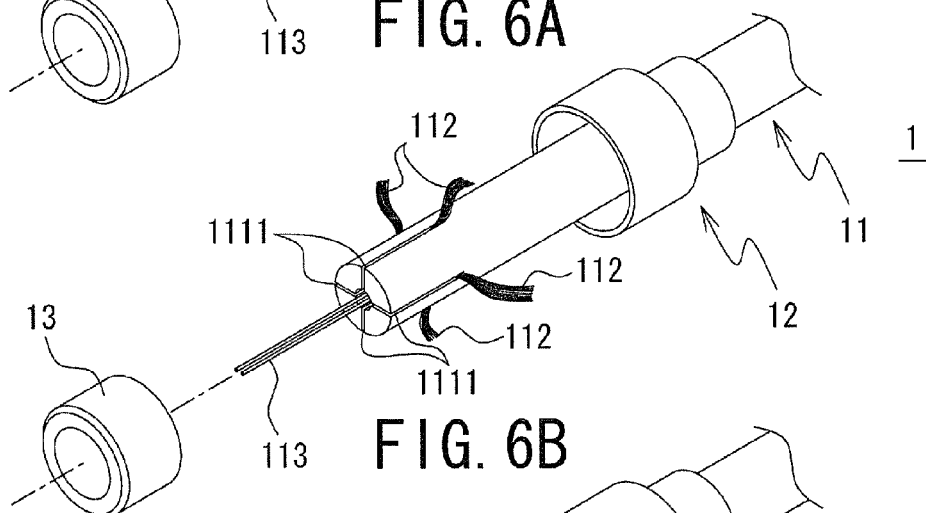
Figure 6C:
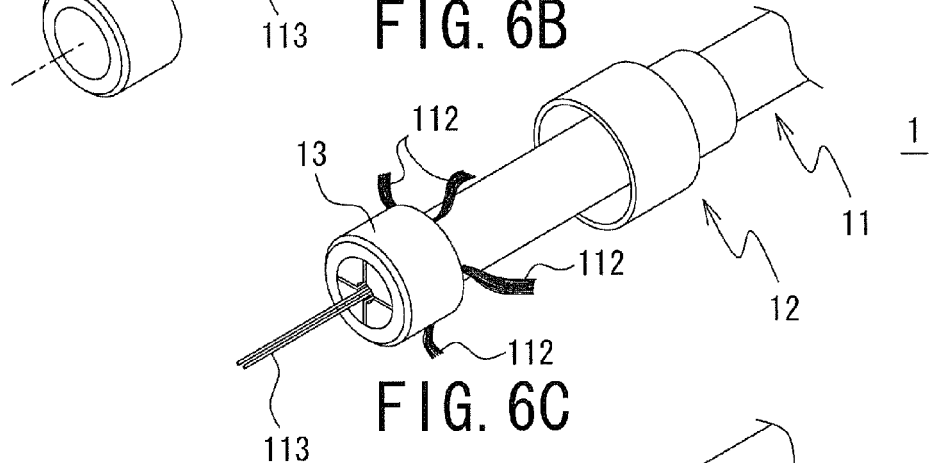
Figure 6D:
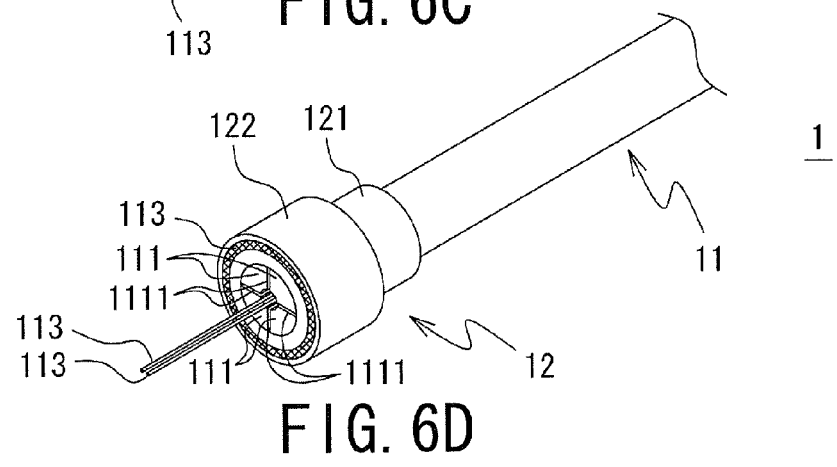

FIG. 1 is an exploded perspective view showing a configuration of a fiber-optic cable 1 with a fitting of one preferred embodiment of the present invention. FIG. 2 is an external perspective view showing the configuration of the fiber-optic cable 1 with the fitting of the present embodiment. FIGS. 3A and 3B are cross-sectional views showing an inner structure of the fiber-optic cable 1 with the fitting of the present embodiment. Shown in FIG. 3A is the longitudinal cross-sectional view showing the profile, which includes slits, of the fiber-optic cable 1 with the fitting. Shown in FIG. 3B is the longitudinal cross-sectional view showing the profile, which is perpendicular to the slits, of the fiber-optic cable 1 with the fitting.

The fiber-optic cable 1 with the fitting of the present embodiment includes a fiber-optic cable 11, a fitting 12, and an inner ring 13 as shown in FIGS. 1 to 3B.

A variety of conventionally known fiber-optic cables can be used for the fiber-optic cable 11. For example, the fiber-optic cable 11 includes a sheath 111, tensile members 112, and optical fibers 113. The sheath 111 has a tube shape, and includes a through-hole extending in the axial direction. The cross-sectional shape of the sheath 111 is not limited specifically. In the present embodiment, the cross-sectional shape is round. The sheath 111 has a structure capable of being compressed and deformed in a radial direction when a compression force is exerted on the circumference of the sheath 111. The sheath 111 is made from a resin material such as polyvinyl chloride, polyethylene, and non-halogenous flame-retardant polyethylene. The tensile members 112 have a string shape. The tensile members 112 are arranged to prevent the optical fibers from being broken when an excessive tensile force is exerted on the fiber-optic cable 11. The tensile members 112 are preferably made from aramid fibers. The optical fibers 113 are arranged to transmit optical signals. A variety of conventionally known optical fibers are used for the optical fibers 113.

The fiber-optic cable 11 has a configuration such that the tensile members and the optical fibers are laid inside the through-hole of the sheath 111. The sheath 111 includes slits 1111 at its end portion, which are arranged to mount the fitting 12 on the fiber-optic cable 11. The slits 1111 extend in the axial direction from an end face of the sheath 111. End portions of the tensile members 112 are drawn out of the sheath 111 through the slits 1111.

The configuration of the fiber-optic cable 11 used in the fiber-optic cable 1 with the fitting of the preferred embodiment of the present invention is not limited to the configurations shown in FIGS. 1 to 3B. It is essential only that the fiber-optic cable 11 should include the tensile members 112 and the optical fibers 113 laid inside of the sheath 11.

The fitting 12 is arranged to be fitted to an optical connector (described later), and thereby connect the fiber-optic cable 11 and the optical connector. The fitting 12 is fixed to the sheath 111 of the fiber-optic cable 11 and the tensile members 112. The fitting 12 includes a first portion 121 and a second portion 122. The first portion 121 is arranged to be fixed to the sheath 111 of the fiber-optic cable 11. The second portion 122, together with the inner ring 13, is arranged to fix the tensile members 112 of the fiber-optic cable 11. In addition, the second portion 122 is arranged to be fitted to the optical connector, and thereby connect the fiber-optic cable 11 and the optical connector.

The first portion 121 of the fitting 12 has a ring or cylindrical shape, and has a through-hole extending in the axial direction. The through-hole has a diameter such that the sheath 111 of the fiber-optic cable 11 can pass through the through-hole. Thus, the through-hole of the first portion 121 is same in size and shape as the sheath 111 of the fiber-optic cable 11. If the sheath 111 of the fiber-optic cable 11 has a round cross-sectional shape of some diameter, the through-hole of the first portion 121 of the fitting 12 is formed so as to have a round shape of the same diameter as the sheath 111.

In addition, the second portion 122 of the fitting 12 has a ring or cylindrical shape, and has a through-hole extending in the axial direction. The through-hole has a diameter such that the inner ring 13 can be inserted in the through-hole. Thus, the through-hole of the second portion 122 is made larger than the external diameter of the inner ring 13.

Thus, the fitting 12 has the ring or cylindrical shape, and has the through-hole. The portions having the through-holes different in diameter (inner diameter) are arranged in series in the axial direction. The portion of which the through-hole diameter is small is the first portion 121. The portion of which the through-hole diameter is large is the second portion 122.

The inner ring 13, together with the fitting 12, is arranged to sandwich and fix the tensile members 112 of the fiber-optic cable 11. The inner ring 13 has a ring or cylindrical shape, and has a through-hole extending in the axial direction. The inner ring 13 has a diameter such that the sheath 111 of the fiber-optic cable 11 can pass through the through-hole. For example, the through-hole of the inner ring 13 is same in diameter as the external diameter of the sheath 111. Further, the inner ring 13 includes asperities on its circumference, which are arranged to increase connection strength to the tensile members 112 of the fiber-optic cable 11.

The fitting 12 and the inner ring 13 are made from metal materials preferably through cutting work. The inner ring 13 has a configuration more difficult to be deformed than the second portion 122 of the fitting 12. For example, the inner ring 13 is made from a material harder than the fitting 12. For example, the inner ring 13 is made from a stainless steel or a copper alloy such as brass, and the fitting 12 is made from aluminum or an aluminum alloy.

Next, a description of a method for producing the fiber-optic cable 1 with the fitting of the present embodiment will be provided.

Figure 7A:
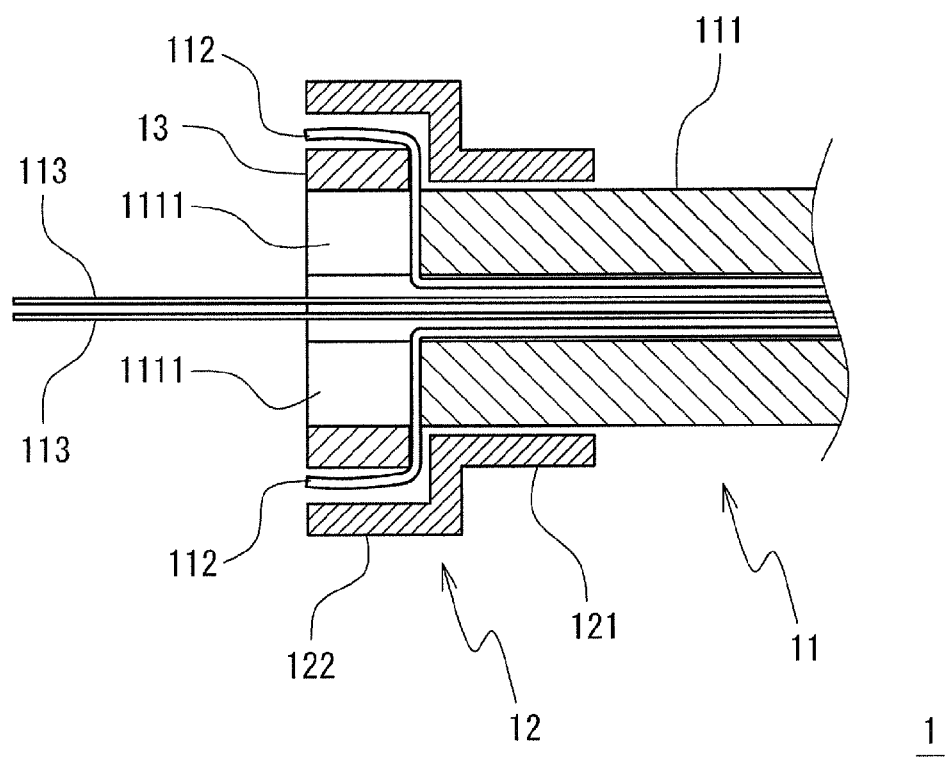
FIGS. 7A and 7B are perspective views schematically showing the state of the fiber-optic cable and the inner ring in building the fiber-optic cable with the fitting of the preferred embodiment of the present invention. Shown in FIG. 7A is the perspective view showing the state where the second portion of the fitting covers the circumference of the inner ring.
Figure 7B:
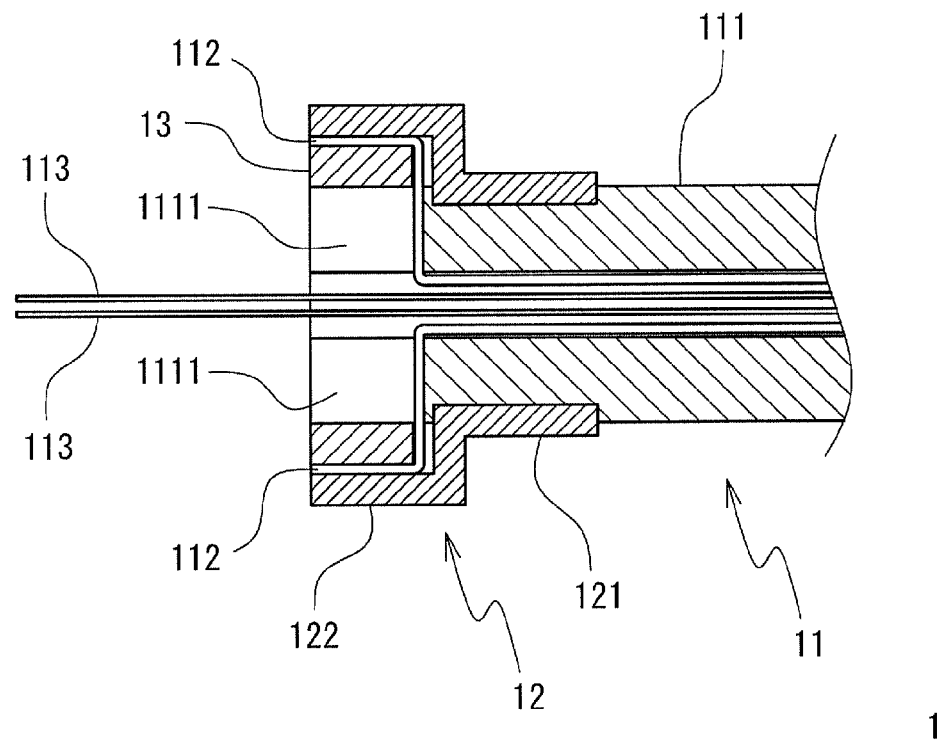

FIGS. 4A to 7B are perspective views schematically showing the state of the fiber-optic cable 11, the fitting 12 and the inner ring 13 in producing the fiber-optic cable 1 with the fitting of the present embodiment. Shown in FIGS. 4A to 6A are the perspective views showing the sheath 111 including the slit(s) 1111. Shown in FIGS. 4B to 6B are the perspective views showing the sheath 111 from which the tensile members 112 are drawn from the slit(s) 1111. Shown in FIGS. 4C to 6C are the perspective views showing the sheath 111 on which the inner ring 13 is mounted. Shown in FIGS. 4D to 6D are the perspective views showing the state where the first portion 121 of the fitting 12 covers the circumference of the inner ring 13. Shown in FIG. 7A is a cross-sectional view showing the state where the first portion 121 of the fitting 12 covers the circumference of the inner ring (a cross-sectional view of the fiber-optic cable 1 with the fitting shown in FIG. 4D.) Shown in FIG. 7B is a cross-sectional view showing the state where the fitting 12 is pressed and deformed.

First, the slit(s) 1111 extending in the axial direction from the end face of the sheath 111 is formed in the sheath 111 of the fiber-optic cable 11 as shown in FIG. 4A to 6A. The fiber-optic cable 11 is inserted in the through-hole of the fitting 12 in advance. The number of the slit(s) 1111 is not limited specifically. The slit (s) 1111 is formed preferably at regular intervals along a circumferential direction of the sheath 111. Shown in FIGS. 4A to 4D is a configuration of including the two slits 1111 that are opposed to each other (at 180-degree intervals). Shown in FIGS. 5A to 5D is a configuration of including the one slit 1111. Shown in FIGS. 6A to 6D is a configuration of including the three or more slits 1111.

When an even number of the slits 1111 are formed in the sheath 111 as shown in FIGS. 5A to 5D and FIGS. 6A to 6D, the operation of forming the slits 1111 is easier because the opposed slits 1111 can be formed at a time by a cutting tool such as a cutter. Especially when two slits 1111 are formed, only one-time cutting can complete the operation of forming the slits 1111, which facilitates the production process.

Then, the tensile members 112 are drawn out of the sheath 111 through the slit(s) 1111 as shown in FIGS. 4B to 6B. In the configurations where the plurality of slits 1111 are formed, it is preferable that the numbers of the tensile members 112 drawn from the slits 1111 are made equal.

In the configuration where the one slit 1111 is formed as shown in FIGS. 5A to 5D, the process of making the tensile members 112 pass through the slit 1111 (fitting the tensile members 112 in the slit 1111) can be facilitated. This configuration is effective when the cable is small in diameter and the tensile members 112 are small in number. In addition, the configuration where the three or more slits 1111 are formed as shown in FIGS. 6A to 6D is effective when the tensile members 112 are large in number with respect to the cable diameter (the diameter of the sheath 111). If the slits 1111 are smaller in number while the tensile members 112 are large in number, the slits 1111 through which the tensile members 112 are made to pass could be stretched out widely. However, in the configuration of including many slits 1111 as described above, the slits 1111 can be prevented from excessively stretching out, and the tensile members 112 can be stably held by the slits 1111.

Figure 8:
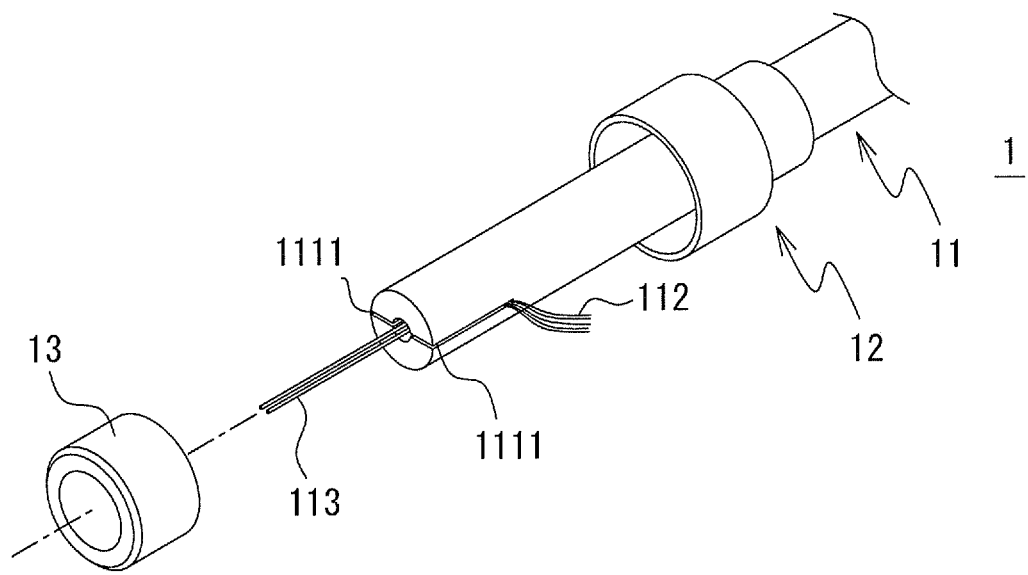
FIG. 8 is a perspective view showing a configuration (modification) of the sheath including the two slits where the tensile members are drawn from only one of the slits.

In the configuration of including the two slits 1111, it is also preferable to make the tensile members 112 pass through either one of the two slits 1111 as shown in FIG. 8. Described above is the configuration that the tensile members 112 pass through either one of the two slits 1111 when the cable is small in diameter and the tensile members 112 are small in number. That is, the configuration that the two slits including unused slit 1111 are formed is also preferable. In the configuration of including the one slit 1111, there arises a problem such that a portion of the sheath 111, which is opposite to the one slit 1111, could be damaged during the step of forming the one slit 1111. Thus, if the two slits 1111 including the unused slit 1111 are formed even in the case of using only the one slit 1111, this problem can be solved. In addition, if the two slits 1111 are formed as above, the positions to form the slits 1111 do not have to be considered. To be specific, in the configuration of including only the one slit 1111, the sheath 111 has biased mechanical strength because of the existence of the one slit 1111 (only the portion of the sheath 111 where the one slit is formed becomes weak), so that the cable could be twisted. In contrast, in the configuration of including the two slits 1111, the occurrence of a twist of the cable due to the biased strength can be reduced.

As described above, the configuration that the tensile members 112 are made to pass through one or some of the slit (s) 1111 while the other slit (s) 1111 is unused is also preferably used. While an increase in the number of the unused slit(s) 1111 could cause a problem such that the end portion of the sheath 11 including the slit (s) 1111 expands to weaken the force to fit the tensile members 112 in the slit(s) 1111, this problem does not arise in the present embodiment because the circumference of the end portion of the sheath 111 including the slit(s) 1111 is pressed by the inner ring 13, of which a detailed description will be provided later.

Then, the inner ring 13 is mounted on the circumference of the end portion of the sheath 111 of the fiber-optic cable 11 as shown in FIGS. 4C to 6C. Mounting the inner ring 13 on the circumference of the end portion of the sheath 111 prevents the slit(s) 1111 formed in the sheath 111 from stretching out. Then, the tensile members 112 become fitted in the slit(s) 1111 of the sheath 111.

Then, the fitting 12 that has been mounted in advance is moved to the end portion of the fiber-optic cable 11 so that the second portion 122 of the fitting 12 covers the circumference of the inner ring 13 as shown in FIGS. 4D to 6D, and 7A. Thus, the tensile members 112 drawn from the slit (s) 1111 of the sheath 111 are disposed between the inner circumference of the second portion 122 of the fitting 12 and the outer circumference of the inner ring 13. In addition, the first portion 121 of the fitting 12 is disposed at a position apart (set back) by a predetermined distance from the end face of the sheath 111.

Then, a compression force is exerted on the circumference of the fitting 12 to plastic-deform the fitting 12 so that the size in the radial direction of the fitting 12 becomes small as shown in FIG. 7B. In particular, the fitting 12 is plastic-deformed such that the inner diameter of the first portion 121 of the fitting 12 becomes smaller than the external diameter of the sheath 111. Then, the first portion 121 of the fitting 12 engages in the sheath 111. In addition, the second portion 122 of the fitting 12 is pressed and deformed, and thus the tensile members 112 drawn from the slit(s) 1111 of the sheath 111 are sandwiched by the first portion 121 of the fitting 12 and the inner ring 13.

Thus, the engagement of the first portion 121 of the fitting 12 in the sheath 111 of the fiber-optic cable 11 allows the fitting 12 to be fixed to the sheath 111 of the fiber-optic cable 11, so that the fitting 12 and the sheath 111 are connected to each other to have a monolithic construction. Further, because the fitting 12 and the inner ring 13 sandwich the tensile members 112, the fitting 12 and the tensile members 112 are connected to each other to have a monolithic construction.

In the fiber-optic cable 1 with the fitting of the present embodiment, the tensile members 112 are drawn out of the sheath 111 through the slit(s) 1111 on the front-end side of the first portion 121 of the fitting 12. Further, the inner ring 13 is disposed on the front-end side more front than the first portion 121 of the fitting 12 and more front than the position where the tensile members 112 are drawn out of the sheath 111 through the slit(s) 1111. Thus, the first portion 121 of the fitting 12 is mounted at a position apart by a predetermined distance from the end face of the sheath 111 toward the rear-end side of the sheath 111. Thus, the sheath 111 has a portion that is not compressed or deformed on the front-end side more front than the first portion 121 of the fitting 12 (that is, a portion where the external diameter of the sheath 111 is larger than the inner diameter of the through-hole of the first portion 121 of the fitting 12 that has been pressed and deformed).

The fiber-optic cable 1 with the fitting of the present embodiment having the configuration described above produces the following action and effect.

The first portion 121 of the fitting 12 is mounted on the sheath 111 of the fiber-optic cable 11 while engaging therein. Further, the sheath 111 has the portion that is not compressed or deformed on the front-end side more front than the first portion 121 of the fitting 12. Because of this configuration, the friction and the portion of the sheath 111 that is not compressed or deformed connect the fitting 12 and the sheath 111 so that the fitting 12 does not move on the circumference of the sheath 11. Thus, connection strength between the fitting 12 and the fiber-optic cable 11 can be increased.

Figure 11A:
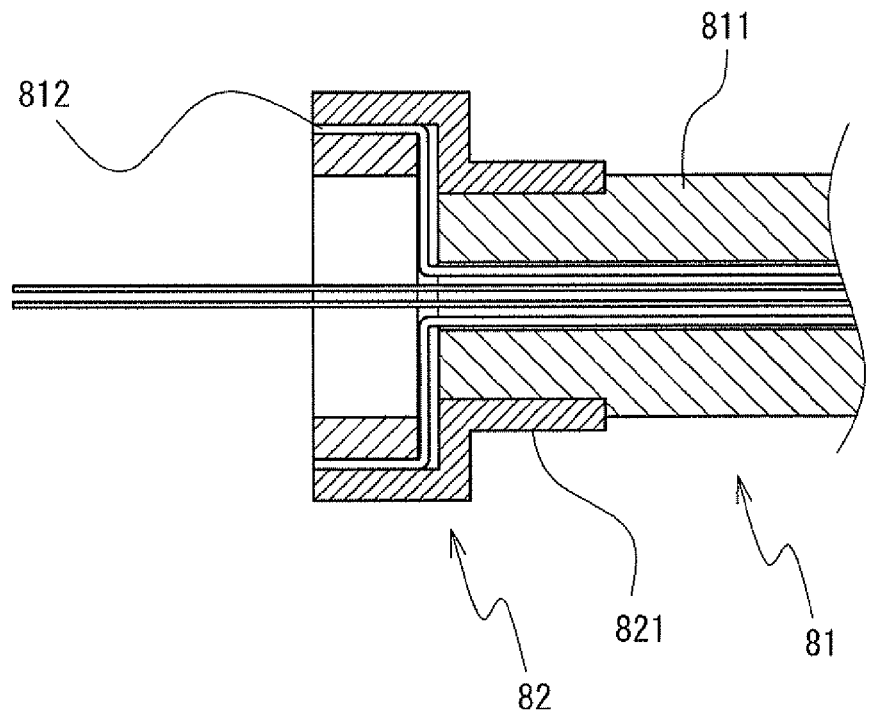
FIGS. 11A and 11B are cross-sectional views showing an example of a conventional fiber-optic cable with a fitting. Shown in FIG. 11A is the cross-sectional view showing the conventional fiber-optic cable with the fitting where a pull force is yet to be exerted. Shown in FIG. 11B is the cross-sectional view showing the conventional fiber-optic cable with the fitting where only a sheath falls off the fitting by a pull force.

To be specific, in a conventional configuration shown in FIG. 11A, a fitting 82 is mounted on a sheath 811 of a fiber-optic cable 81 at a position very close to an end face of the sheath 811. Thus, the sheath 811 does not have a portion that is not compressed or deformed on a front-end side more front than a first portion 821 of the fitting 82 (alternatively, the sheath 811 itself does not exist there). Thus, the fitting 82 and the sheath 811 are connected with each other only by the friction between the fitting 82 and the compressed circumference of the sheath 811. In this case, if a pull force larger than the friction is exerted between the sheath 811 and the fitting 82, the sheath 811 moves in an axial direction inside the fitting 82 to fall off the fitting 82 as shown in FIG. 11B because tensile members 812 and the sheath 811 do not have a monolithic construction.

In contrast, in the fiber-optic cable 1 with the fitting of present embodiment, the sheath 111 has the portion that is not compressed or deformed on the front-end side more front than the first portion 121 of the fitting 12. Thus, if a pull force larger than the friction is exerted between the sheath 111 and the fitting 12, the portion that is not compressed or deformed is caught by the fitting 12 to prevent the sheath 111 from moving, or to minimize the movement. That is, in order to move the sheath 111 in the axial direction, it is necessary to not only exert a force larger than the friction between the first portion 121 of the fitting 12 and the sheath 111, but also compress and deform the end portion of the sheath 111. For this reason, the connection strength between the fitting 12 and the sheath 111 increases compared with the configuration that the fitting 12 and the sheath 111 are connected with each other only by friction (in other words, the force necessary to move the sheath 111 in the axial direction becomes larger).

In addition, the tensile members 112 drawn out of the sheath 111 through the slit(s) 1111 at the portion of the sheath 111 on the front-end side more front than the first portion 121 of the fitting 12. The tensile members 112 are fitted (i.e., lie) in the slit(s) 1111 at this portion of the sheath 111, so that the slit(s) 1111 is pushed to stretch out in the circumferential direction to make this portion of the sheath 111 larger in size in the circumferential direction than the other portion of the sheath 111. Thus, this portion of the sheath 111 can prevent the sheath 111 from falling off the fitting 12 or minimize the fall more efficiently than the other portion of the sheath 111. In other words, though the fitting 12 needs to pass through this portion of the sheath 111 in order to move toward the end portion of the sheath 111, a force necessary to compress and deform this portion of the sheath 111 is larger than a force necessary to compress and deform the other portion because this portion of the sheath 111 is larger in external diameter than the other portion. For this reason, the connection strength between the fitting 12 and the sheath 111 increases.

Figure 11B:
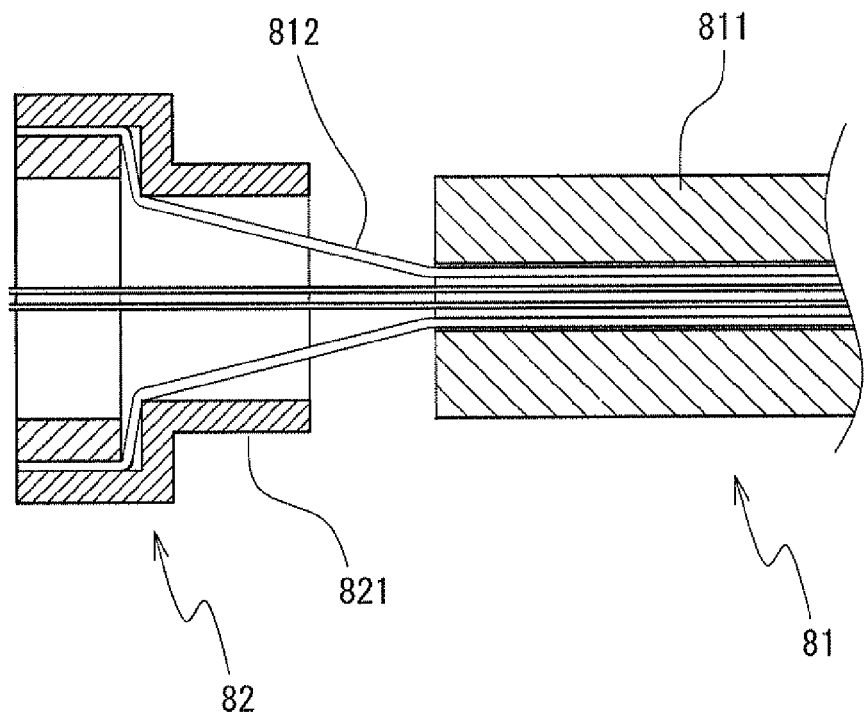

In order to know the effect of the fiber-optic cable 1 with the fitting of present embodiment, comparative evaluations of sheath-gripping force of the fiber-optic cable 1 with the fitting were conducted in a case where the slit(s) 1111 was formed in the sheath 11 and a case where no slit 1111 was formed in the sheath 11 (the configuration shown in FIGS. 11A and 11B). The fiber-optic cables were made from a PE-based resin, and the sheaths were 3.0 mm in external diameter and 1.5 mm in inner diameter. Comparisons thereof were made under the same crimping conditions. The fittings 12 and 18 were made from a free-cutting aluminum alloy, had a sheath-gripping length of 5 mm, and had an engagement amount of about 0.2 mm in the sheaths 111 and 811 after being crimped. Evaluation tests were conducted such that only the sheaths 111 and 811 were pulled without pulling the tensile members with the use of a general-purpose tensile tester. As a result, while the average of the sheath-gripping forces in the case where no slit(s) was formed in the sheath was 15.2 N, the average of the grip forces in the case where the slit(s) was formed in the sheath was 46.9 N. Thus, the fiber-optic cable 1 with the fitting of present embodiment was shown to have the obvious effect of improving the sheath-gripping force.

Further, in the fiber-optic cable 1 with the fitting of present embodiment, the length in the axial direction of the first portion 121 of the fitting 12 can be made short, and the connection strength between the fitting 12 and the fiber-optic cable 11 can be increased at the same time. Alternatively, even if the length in the axial direction of the first portion 121 of the fitting 12 is made short, reduction in the connection strength between the fitting 12 and the fiber-optic cable 11 can be prevented or minimized. Thus, the fitting 12 can be reduced in size. Then, the reduction in size of the fitting 12 can reduce the size of an entire optical connector 2.

In addition, the tensile members 112 of the fiber-optic cable 11 are sandwiched by the inner ring 13 and the second portion 122 of the fitting 12. Thus, external forces (in particular, a pull force) exerted on the tensile members 112 are applied on the tensile members 112 of the fiber-optic cable 11 (i.e., the tensile members 112 bear the forces). Thus, the fitting 12 can be prevented from falling off the fiber-optic cable 11.

Figure 10A:
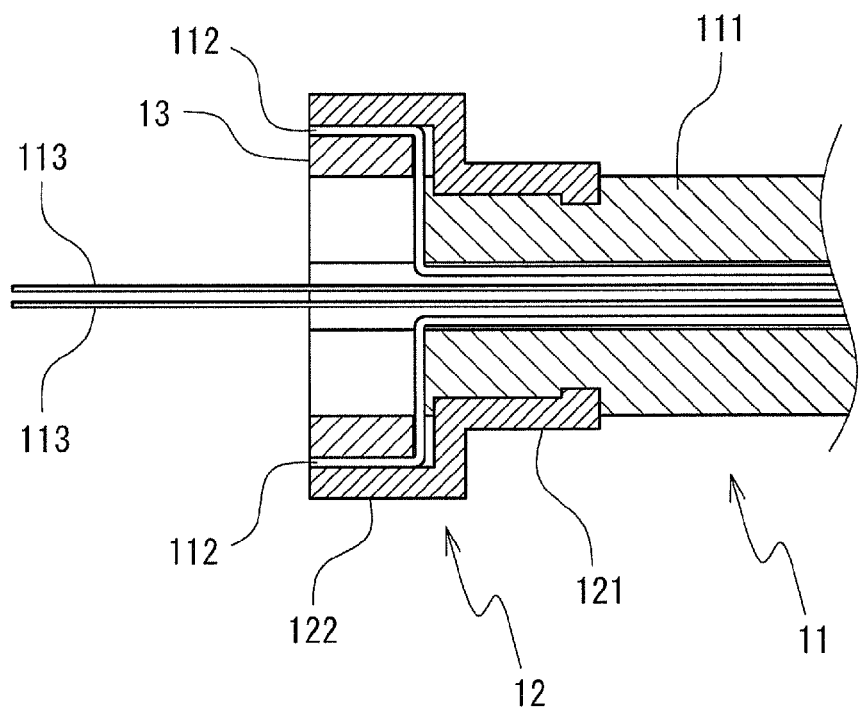
FIGS. 10A and 10B are longitudinal cross-sectional views showing a modified inner structure of the fiber-optic cable with the fitting of the preferred embodiment of the present invention. Shown in FIG. 10A is an example that an inner face of the first portion of the fitting includes a step. Shown in FIG. 10B is an example that threads are cut on an inner face of the first portion of the fitting.
Figure 10B:
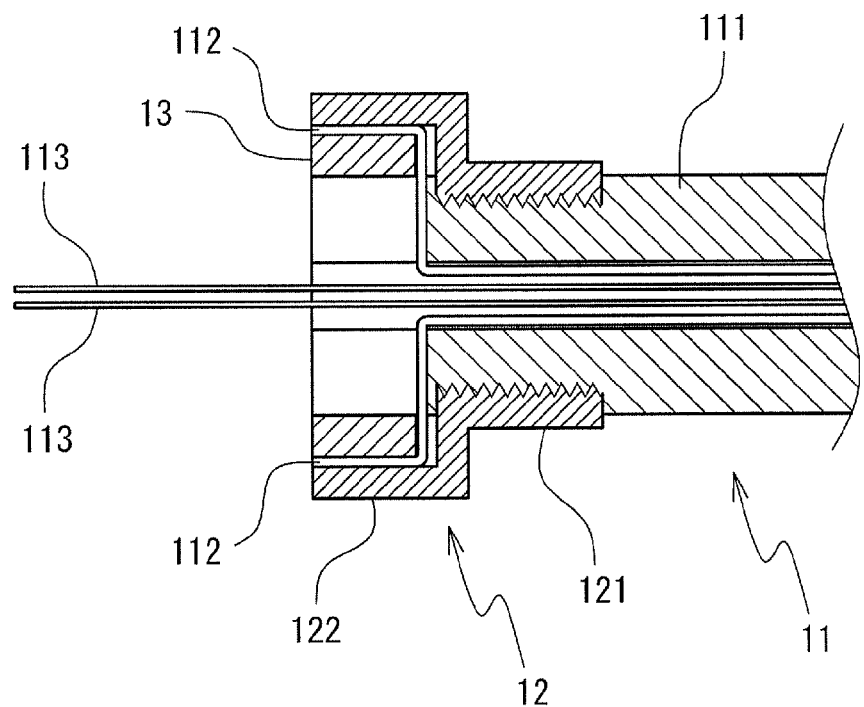

FIGS. 10A and 10B show modifications of the fiber-optic cable 1 with the fitting of the present embodiment. Shown in FIG. 10A is the example that an inner face of the first portion 121 of the fitting 12 includes a step. Shown in FIG. 108 is the example that threads are cut on an inner face of the first portion 121 of the fitting 12. These structures can further strengthen the connection between the fitting 12 and the sheath 111. However, providing these structures has an economic disadvantage, so that it is essential only to provide an appropriate structure according to the level of actual request.

Next, a description of a configuration of connecting an optical connector d to the fiber-optic cable with the fitting of the present embodiment will be provided.

Figure 9:
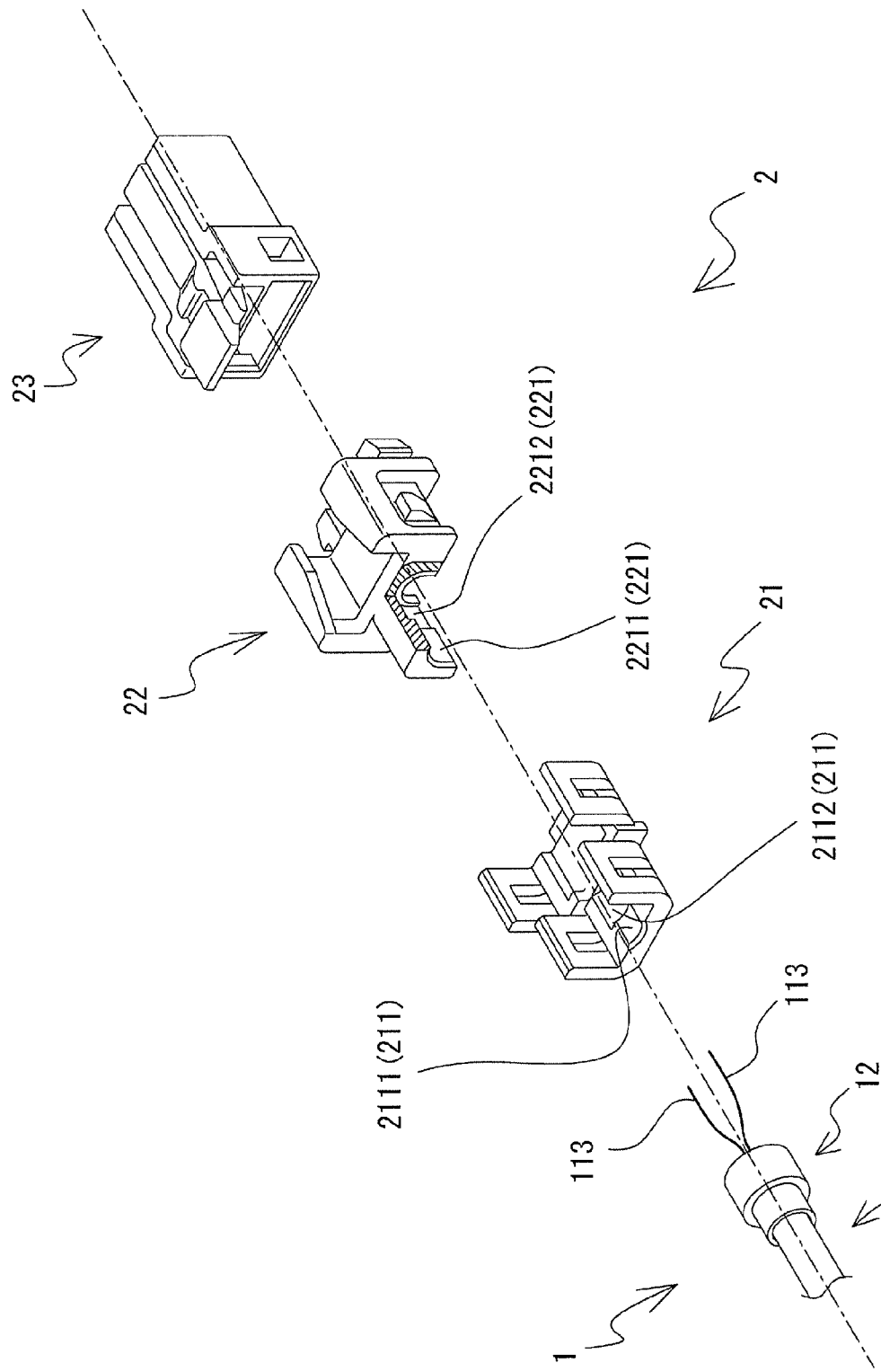
FIG. 9 is an exploded perspective view (a cross-sectional view in part) showing a schematic configuration of an optical connector that is applicable (connectable) to a fiber-optic cable 1 with a fitting of the preferred embodiment of the present invention.

FIG. 9 is an exploded perspective view (a cross-sectional view in part) showing a schematic configuration of the optical connector that is applicable (connectable) to the fiber-optic cable 1 with the fitting of the present embodiment. An optical connector 2 has a configuration such that a ferrule (not illustrated) and a split sleeve (not illustrated) are housed in a connector housing. The front end of the optical fibers 113 of the fiber-optic cable 11 is fixed to the ferrule, a detailed description of which is omitted. The split sleeve is made from a metallic material, and has a tube shape. The front end of the ferrule is inserted from the rear end of the split sleeve. When the optical connector fits into a counterpart connector (not illustrated), a ferrule of the counterpart connector enters into the split sleeve from the front end of the split sleeve, and the front ends of the ferrules butt against each other in the split sleeve. Thus, the optical fibers fixed to the ferrules are optically joined.

The connector housing of the optical connector 2 includes a first housing member 21, a second housing member 22, and a third housing member 23. The first housing member 21 and the second housing member 22 are connected to each other to sandwich the fitting 12 of the fiber-optic cable 1 with the fitting of the present embodiment. The third housing member 23 is mounted to the front end of the connected first and second housing members 21, 22. The connected first, second and third housing members 21, 22 and 23 form the connector housing of the optical connector 2.

The first housing member 21 and the second housing member 22 include cable-holding members 211 and 221 respectively at their rear ends, which are roundly concave in cross section. The cable-holding members 211 and 221 include small diameter members 2111 and 2211 respectively at their rear ends, which are relatively smaller in diameter, and large diameter members 2112 and 2212 respectively at their front ends, which are relatively larger in diameter (larger than the small diameter members).

The fitting 12 fixed to the sheath 111 of the fiber-optic cable 11 is fixed to the cable-holding members 211 and 221 having the configurations described above. To be specific, the connected first and second housing members 21 and 22 allow the first portion 121 of the fitting 12 to be sandwiched by the small diameter members 2111 and 2211 of the cable-holding members 211 and 221, and allow the second portion 122 of the fitting 12 to be sandwiched by the large diameter members 2112 and 2212 of the cable-holding members 211 and 221. The first portion 121, which is relatively smaller in diameter, is sandwiched and held by the first and second housing members on the side more front than the second portion 122, which is relatively larger in diameter. Thus, even if the fiber-optic cable 11 is pulled, the fiber-optic cable 11 does not fall off the optical connector 2.

As described above, the fitting 12 is fixed to the fiber-optic cable 11, and fitted to the optical connector 2. The fiber-optic cable 11 and the optical connector 2 are connected to each other in this manner.

It is to be noted that the optical connector 2 is only one example, and the configuration of an optical connector to be used is not limited to the optical connector 2.

INDUSTRIAL APPLICABILITY

The foregoing description of the preferred embodiments of the present invention has been presented for purposes of illustration and description; however, it is not intended to be exhaustive or to limit the present invention to the precise form disclosed, and modifications and variations are possible as long as they do not deviate from the principles of the present invention.

In the above-described embodiments, the fiber-optic cable includes the sheath having a tube shape; however, the cross-sectional shape of the sheath of the fiber-optic cable is not limited specifically. Any fiber-optic cables including tensile members and optical fibers that are laid inside a sheath can be used in the present invention irrespective of the cross-sectional shape of the sheath. For example, fiber-optic cables having a square shape or an oval shape in cross section also can be used in the present invention. In this case, the shapes of the inner ring and the fitting are chosen according to the cross-sectional shape of the sheath.

In addition, the configuration of the fiber-optic cable, which is used in the fiber-optic cable with the fitting of the present embodiment, is not limited to the configuration described above. Any fiber-optic cables including tensile members and optical fibers can be used in the present invention.

The invention claimed is:

1. A fiber-optic cable with a fitting that comprises:
   a fiber-optic cable that comprises:
      a sheath comprising a slit on an end face thereof in a longitudinal direction, the sheath having,
         a first region; and
         a second region that is arranged closer to the end face in the longitudinal direction than the first region;
      a tensile member inside the sheath, an end portion of the tensile member drawn out of the sheath through the slit;
      an inner ring mounted on a circumference of the sheath from a position of the sheath where the tensile member is drawn out of the sheath through the slit to a side of the end face of the sheath; and
   the fitting mounted on the circumference of the sheath, the fitting comprising:
      a first portion having one of a ring shape or a cylindrical shape, and including a through-hole, the first portion mounted on the circumference of the first region of the sheath, from the position of the sheath where the tensile member is drawn out of the sheath through the slit to a position of the sheath that is on a side opposite to the side where the inner ring is mounted; and
      a second portion having one of a ring shape or a cylindrical shape, and including a through-hole having a larger diameter than a diameter of the through-hole of the first portion, the second portion mounted on the circumference of the sheath while covering a circumference of the inner ring,
      the first and second portions having an integral construction,
   wherein the first portion of the fitting engages in the circumference of the first region of the sheath to connect with the sheath, and the first portion of the fitting and the first region of the sheath are pressed and deformed such that an inner diameter of the first portion of the fitting and an outer diameter of the first region of the sheath are smaller than an outer diameter of the second region of the sheath, wherein the fitting is formed from a metal material
   wherein the end portion of the tensile member is sandwiched by the inner ring and the second portion of the fitting, and
   wherein the second region of the sheath is not compressed or deformed.

2. The fiber-optic cable with the fitting according to claim 1, wherein the slit of the sheath comprises two opposed slits.

3. The fiber-optic cable with the fitting according to claim 1, wherein the slit of the sheath comprises one slit.

4. The fiber-optic cable with the fitting according to claim 1, wherein the slit of the sheath comprises three or more slits.

5. The fiber-optic cable with the fitting according to claim 4, wherein the tensile member is drawn out of the sheath through one or some of the slits.

6. The fiber-optic cable with the fitting according to claim 2, wherein the tensile member is drawn out of the sheath through one or some of the slits.

7. The fiber-optic cable with an optical connector that comprises:
   the fiber-optic cable with the fitting according to claim 1; and
   an optical connector comprising first and second housing, each of the housings comprising:
   a smaller concavity having a relatively smaller diameter that is formed at a base end of the housing; and
   a larger concavity having a relatively larger diameter that is formed at a top end of the housing,
   wherein the fitting is sandwiched and held between the first and second housings, with the first portion of the fitting engaging in the smaller concavities of the housings and with the second portion of the fitting engaging in the larger concavities of the housings.

8. The fiber-optic cable with an optical connector that comprises:
   the fiber-optic cable with the fitting according to claim 2; and
   an optical connector comprising first and second housing, each of the housings comprising:
   a smaller concavity having a relatively smaller diameter that is formed at a base end of the housing; and
   a larger concavity having a relatively larger diameter that is formed at a top end of the housing,
   wherein the fitting is sandwiched and held between the first and second housings, with the first portion of the fitting engaging in the smaller concavities of the housings and with the second portion of the fitting engaging in the larger concavities of the housings.

9. The fiber-optic cable with an optical connector that comprises:
   the fiber-optic cable with the fitting according to claim 3; and
   an optical connector comprising first and second housing, each of the housings comprising:
   a smaller concavity having a relatively smaller diameter that is formed at a base end of the housing; and
   a larger concavity having a relatively larger diameter that is formed at a top end of the housing,
   wherein the fitting is sandwiched and held between the first and second housings, with the first portion of the fitting engaging in the smaller concavities of the housings and with the second portion of the fitting engaging in the larger concavities of the housings.

10. The fiber-optic cable with an optical connector that comprises:
    the fiber-optic cable with the fitting according to claim 4; and
    an optical connector comprising first and second housing, each of the housings comprising:
    a smaller concavity having a relatively smaller diameter that is formed at a base end of the housing; and
    a larger concavity having a relatively larger diameter that is formed at a top end of the housing,
    wherein the fitting is sandwiched and held between the first and second housings, with the first portion of the fitting engaging in the smaller concavities of the housings and with the second portion of the fitting engaging in the larger concavities of the housings.

11. The fiber-optic cable with an optical connector that comprises:
    the fiber-optic cable with the fitting according to claim 5; and
    an optical connector comprising first and second housing, each of the housings comprising:
    a smaller concavity having a relatively smaller diameter that is formed at a base end of the housing; and
    a larger concavity having a relatively larger diameter that is formed at a top end of the housing,
    wherein the fitting is sandwiched and held between the first and second housings, with the first portion of the fitting engaging in the smaller concavities of the housings and with the second portion of the fitting engaging in the larger concavities of the housings.

12. The fiber-optic cable with an optical connector that comprises:
    the fiber-optic cable with the fitting according to claim 6; and
    an optical connector comprising first and second housing, each of the housings comprising:
    a smaller concavity having a relatively smaller diameter that is formed at a base end of the housing; and
    a larger concavity having a relatively larger diameter that is formed at a top end of the housing,
    wherein the fitting is sandwiched and held between the first and second housings, with the first portion of the fitting engaging in the smaller concavities of the housings and with the second portion of the fitting engaging in the larger concavities of the housings.

13. The fiber-optic cable with the fitting according to claim 1, wherein the inner ring is formed from a metal material, the inner ring having a greater resistance to deformation than the second portion of the fitting.

14. The fiber-optic cable with the fitting according to claim 1, wherein a region of the sheath through which the tensile member is drawn out is pushed to stretch out in the circumferential direction such that the region is larger in size in the circumferential direction than the first and second regions of the sheath.

* * * * *